Jan. 4, 1949.  M. A. REINMANN  2,458,419
WIND WHEEL
Filed Jan. 5, 1944
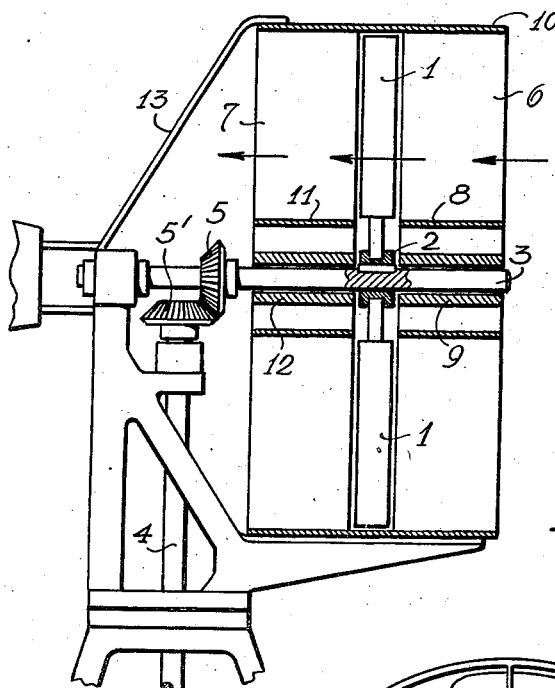
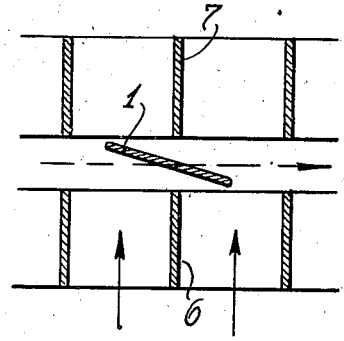
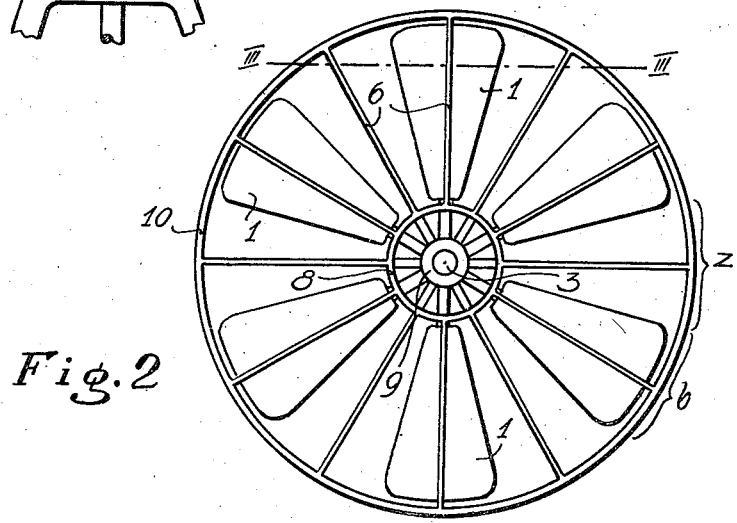
INVENTOR.
MOSES ABRAHAM REINMANN
BY Haseltine Lake & Co.
ATTORNEYS.

Patented Jan. 4, 1949

2,458,419

UNITED STATES PATENT OFFICE 2,458,419

WIND WHEEL

Moses Abraham Reinmann, Jerusalem, Palestine

Application January 5, 1944, Serial No. 517,037
In Palestine February 4, 1943

2 Claims. (Cl. 170—40)

This invention relates to wind wheels by means of which wind pressure can be utilized, for example for actuating a dynamo, pump or other machine. It is the object of this invention to increase the efficiency of such wind wheels.

As is known, wind wheels consist of a number of vanes or sails radially mounted on a hub which is keyed on a shaft. Their plane of rotation is usually vertical and can be turned so as to be at any time perpendicular to the direction of the wind. Each single sail is inclined relative to the plane of rotation. Two main factors have to be taken into account in the construction of such wheels: The ratio $u:v$ of the speed of rotation $u$ of the wheel to the wind velocity $v$, and the ratio $b:z$ of the width $b$ of a single sail to the distance $z$ between two neighbouring sails. The values of $b$, $z$ and $u$ are measured at the circumference of the wheel, $z$ being the apparent distance between the sails as projected into and measured in the plane of rotation. (In the equations below, these values are assumed to be expressed in meters and meters per second respectively, or centimeters and centimeters per second.) It is known in practice that with usual wind-wheels, both these factors are interdependent in such a way that in order to increase the rotating speed of the wheel with a given wind velocity, that is, to increase the value of the ratio $u:v$, the value of $z$ has to be made large which is done by providing in the wheel a small number $n$ of sails, that is, a small total sail surface F. Conversely, with a large total sail surface F, a smaller value of the ratio $u:v$ is obtained. Known low-speed wind-wheels (designed for a ratio $u:v=$about 1 to 1.5) consist of a great number of narrow sails, or of a smaller number of broad sails, with small distances $z$ between them, that is, the magnitude of the ratio $b:z$ is relatively great. On the other hand, high-speed wind-wheels (designed for a ratio $u:v=$about 6) are made with 3 or 4 narrow sails and correspondingly large distances between them. Between these extremes, about every intermediate type has been built. Now, it is equally known that the efficiency of wind wheels is the greater, the higher their running speed while, on the other hand, their efficiency in utilizing a given wind power drops as the total sail surface is decreased. Thus, an increase of efficiency due to higher running speed is counterbalanced by a loss of efficiency due to the diminution of the total sail surface so that with the ratio $u:v$ being comprised between about 1 and 6, as explained above, which are so far the practical limits, the all-round efficiency of the wheel varies hardly.

It has now been found that it is not necessary to limit the total sail surface for obtaining a higher running speed if the wind is so guided to the sails that after impinging thereon it is not deflected laterally but can leave the wheel only thereby that part of it passes between the sails in the impinging direction and the rest is thrown back in a diametrically opposite direction.

Accordingly, this invention consists in the arrangement, at either side of the wind wheel at a small distance therefrom substantially co-extensive therewith and in a plane parallel to the plane of rotation, of stationary wheels co-axial with the wind wheel, said stationary wheels having pairs of aligned straight radial vanes or spokes with such distances between them that the clearances are of a width equal to or smaller than that of the sails of the wind wheel, all of them measured at the same distance from the centre of both wheels, and being contained in a common cylindrical casing co-axial with the wheels and closely surrounding them.

Without going into details of the theory that is at the base of this invention, one may assume that the effect of the stationary wheels according to this invention is to prevent the air from being deflected laterally after impinging on the sail, which deflection would influence the stream of incoming fresh air and result in an undesired change of the impinging angle thereof. Owing to the provision of the stationary wheels according to this invention, the wind cannot be deflected and acts on the rotating wheel perpendicularly to the plane of rotation. Experiments have shown that the best results are obtained with values of $z$ comprised between $$\frac{120}{u}\cdot b\cos\alpha \text{ and } \frac{180}{u}\cdot b\cos\alpha$$

wherein $\alpha$ is the angle of inclination of the sails relative to the plane of rotation. It has been found to be advantageous if $z$ is not smaller than $b$. This formula holds good in the case of the arrangement of a stationary wheel in front of the wind wheel, and of a similar stationary wheel therebehind, in accordance with this invention, and expresses that the distance $z$ between each two sails can be made the smaller (that is, the total sail surface the greater), the greater the proposed running speed $u$ of the wheel, and this within the limits given by the above formulas. This is just the contrary of the experience made heretofore with wind wheels lacking the stationary wheels according to the invention, as has been explained above.

The stationary wheels according to this invention prevent lateral deflections of the wind even if the depth $h$ of their vanes or spokes (measured in the direction perpendicular to the plane of rotation of the wind-wheel), is small, and indeed as small as a fraction of the width of the sails. Yet a further increase of the efficiency of the wind-wheel can be obtained if the vanes or spokes are given a larger depth. The value of $h$ can then be taken into account in the calculation of $z$ which can be made still smaller than corresponds to the formula given hereinbefore, and can be chosen in accordance with the equation $$z = \frac{120}{u} \cdot b \cdot \cos \alpha - h \text{ to } \frac{180}{u} \cdot b \cdot \cos \alpha - h$$

Moreover, the efficiency would theoretically be highest if the value of $z+h$ were constant over the whole length of the vanes. Now, since $z$ decreases towards the centre, $h$ should increase accordingly, which will result in a trapezoidal shape of the vanes of the stationary wheels. While the necessity of diminishing the total sail surface in proportion to the proposed increase of the running speed of the wind-wheel had made it hitherto impossible to give the ratio $u:v$ a value greater than 6, far higher values of this ratio can now be employed with well increased efficiency.

It is known, however, that high-speed wind-wheels reach their full intended speed only very gradually, if at all. Therefore, it may be advisable to arrange an auxiliary starting motor drive which brings the wind wheel under no-load up to the desired speed whereafter the auxiliary drive is disconnected and the wind-wheel is connected to the dynamo, pump or other machine. Arrangements may also be made for the wind-wheel to be disconnected automatically from said machine and to be connected to the starting motor in case its speed drops below a pre-determined value.

The invention is diagrammatically illustrated, by way of example only, in the accompanying drawings in which Fig. 1 is a part sectional side elevation of a wind wheel with stationary wheels at its front and rear sides;

Fig. 2 is a fragmentary front elevation corresponding to Fig. 1.

Fig. 3 is a section along line III—III, Fig. 2, turned by 90°.

The wind wheel proper consists of radial sails 1 mounted on a hub 2 which is keyed on a horizontal shaft 3. This shaft drives a vertical shaft 4 by means of a bevel gear 5, 5'. Conversely, where an auxiliary starting motor is provided, as explained above, this may act on the wind wheel via shafts 4 and 3.

In front of the wind wheel and concentrically therewith, a stationary wheel is located. It comprises a wheel 8 with hub 9 through which latter the shaft 3 of the wind wheel passes, and an outer casing 10. Between the wheel 8 and the said casing, and fixed to both, there extend radial vanes or spokes 6.

The width of the clearances between these is smaller than the width of sails 1 (see Fig. 2). A similar wheel comprising vanes or spokes 7, an inner wheel 11 and a hub 12, is arranged at the rear side of the wind wheel within the same casing 10. Vanes 7 register with vanes 6 so that a system of cells is formed in front and behind the wind wheel. Casing 10 is fixed to the wind wheel tower (not shown) by means of brace bars 13.

I claim:

1. In a wind motor in combination: a wheel rotatable in a vertical plane which can be turned so as to be perpendicular to the wind, said wheel having a plurality of substantially sector-shaped sails fixed to a common hub mounted on a horizontal shaft, with clearance between the projections of said sails on the plane of rotation; a stationary cylindrical casing closely surrounding said wheel and being co-axial therewith; a plurality of pairs of aligned straight radial vanes extending inwards from said casing normal to the plane of rotation of the wheel at both sides of said wheel, the inner ends of said vanes being secured to two sleeves surrounding said shaft at either side of the wheel, the distance between said vanes in axial direction substantially corresponding to the depth of the path covered by said wheel while the distances between any two neighboring vanes are not larger than the width of the projection of any one of said sails on the plane of rotation, measured at equal distances from the axis, the spaces between each two neighboring pairs of aligned vanes thus forming a plurality of straight air channels of uniform cross-sectional area, and the sails of the wheel being so positioned relative to the plane of rotation as to be adapted substantially to shut off said air channels individually, intermittently and simultaneously as the wheel rotates.

2. In a wind motor in combination: a wheel rotatable in a vertical plane which can be turned so as to be perpendicular to the wind, said wheel having a plurality of substantially sector-shaped sails fixed to a common hub mounted on a horizontal shaft, said sails being so spaced from one another that in their projection on the plane of rotation the clearances between neighboring sails are not narrower than the sails measured at equal distances from the axis of said wheel; a stationary cylindrical casing closely surrounding said wheel and being co-axial therewith; a plurality of pairs of aligned straight radial vanes extending inwards from said casing normal to the plane of rotation of the wheel at both sides of said wheel, the inner ends of said vanes being secured to two sleeves surrounding said shaft at either side of the wheel, the distance between said vanes in axial direction substantially corresponding to the depth of the path covered by said wheel, while the distances between any two neighboring vanes are not larger than the width of the projection of any one of said sails on the plane of rotation, measured at equal distances from the axis, the spaces between each two neighboring pairs of aligned vanes thus forming a plurality of straight air channels of uniform cross-sectional area, and the sails of the wheel being so positioned relative to the plane of rotation as to be adapted substantially to shut off said air channels individually, intermittently and simultaneously as the wheel rotates.

MOSES ABRAHAM REINMANN.

REFERENCES CITED

The following references are of record in the file of this patent:

UNITED STATES PATENTS

| Number | Name | Date |
| --- | --- | --- |
| 766,219 | Clemson | Aug. 2, 1904 |
| 859,938 | Gow | July 16, 1907 |
| 1,456,322 | McNeill | May 22, 1923 |
| 1,958,145 | Jones | May 8, 1934 |
| 2,262,854 | Morris | Nov. 18, 1941 |